US008170296B2

(12) United States Patent
Tokuse

(10) Patent No.: US 8,170,296 B2
(45) Date of Patent: May 1, 2012

(54) IMAGE PROCESSING APPARATUS, IMAGE PROCESSING METHOD, AND PROGRAM

(75) Inventor: Akira Tokuse, Kanagawa (JP)

(73) Assignee: Sony Corporation, Tokyo (JP)

( * ) Notice: Subject to any disclaimer, the term of this patent is extended or adjusted under 35 U.S.C. 154(b) by 1201 days.

(21) Appl. No.: 11/865,430

(22) Filed: Oct. 1, 2007

(65) Prior Publication Data

US 2008/0152228 A1    Jun. 26, 2008

(30) Foreign Application Priority Data

Nov. 6, 2006    (JP) ................................ P2006-300631

(51) Int. Cl.
*G06K 9/00*    (2006.01)

(52) U.S. Cl. ......................................................... 382/118

(58) Field of Classification Search ........................ None
See application file for complete search history.

(56) References Cited

U.S. PATENT DOCUMENTS

| 5,296,945 | A |   | 3/1994 | Nishikawa et al. |
| 6,975,759 | B2 |  | 12/2005 | Lin |
| 2002/0015514 | A1 | * | 2/2002 | Kinjo ............................ 382/118 |
| 2004/0086157 | A1 |  | 5/2004 | Sukegawa |
| 2004/0156544 | A1 |  | 8/2004 | Kajihara |

FOREIGN PATENT DOCUMENTS

| CN | 1494037 A | 5/2004 |
| JP | 05-068262 | 3/1993 |
| JP | 10-271316 | 10/1998 |
| JP | 2001-148863 | 5/2001 |
| JP | 2001-257896 | 9/2001 |
| JP | 2002-077592 | 3/2002 |
| JP | 2003-333618 | 11/2003 |
| JP | 2004-297698 | 10/2004 |
| JP | 2004-363775 | 12/2004 |
| JP | 2005-531189 | 10/2005 |
| JP | 2006-012062 | 1/2006 |
| JP | 2006-019928 | 1/2006 |
| JP | 2006-050559 | 2/2006 |
| JP | 2006-179987 | 7/2006 |

* cited by examiner

*Primary Examiner* — Brian Werner
*Assistant Examiner* — Elisa Rice
(74) *Attorney, Agent, or Firm* — Oblon, Spivak, McClelland, Maier & Neustadt, L.L.P.

(57) ABSTRACT

An image processing apparatus includes a face-image storage unit storing a face image of a predetermined face as a registered face image; a color storage unit storing face-color information, which is information regarding a face color of the registered face image; a detector detecting a face image in an input image; a correcting unit correcting face-color information of the face image detected in the input image; and a comparator comparing the face image detected in the input image with the registered face image and obtaining a registered face image that is most similar to the detected face image as a comparison result. The correcting unit corrects face-color information of a face image detected in a next input image on the basis of the face-color information of the registered face image serving as the comparison result, which is stored in the color storage unit.

12 Claims, 11 Drawing Sheets

FIG. 3
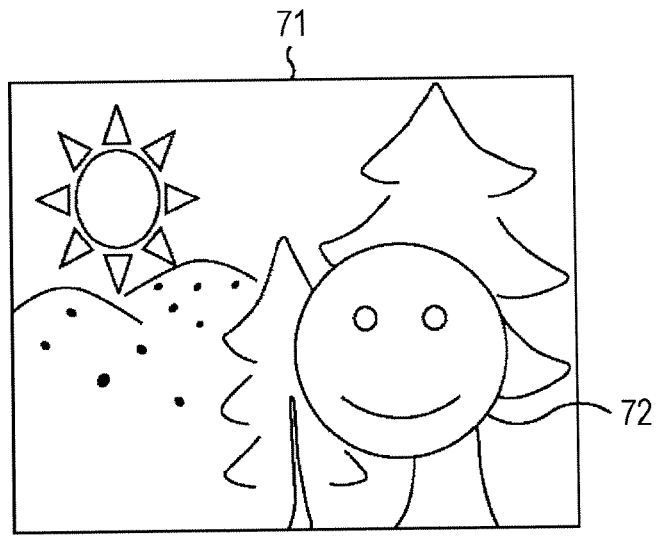
FIG. 4
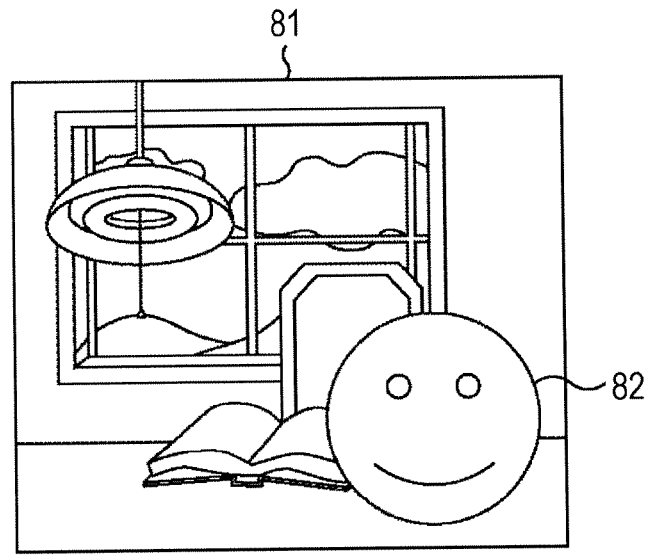
FIG. 5
| NAME | Y | Cb | Cr |
|------|-----|----|----|
| MR. A | 145 | -9 | 13 |
| MR. B | — | — | — |
| MR. C | 160 | -4 | 10 |
| ⋮ | ⋮ | ⋮ | ⋮ |

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-300631 filed in the Japanese Patent Office on Nov. 6, 2006, the entire contents of which are incorporated herein by reference.

BACKGROUND OF THE INVENTION

1. Field of the Invention

The present invention relates to image processing apparatuses, image processing methods, and programs, and more particularly, to an image processing apparatus, an image processing method, and a program for correcting the color of a face in an image to a face color suitable to that face.

2. Description of the Related Art

In the related art, image capturing apparatuses configured to perform color correction of a captured image so that a particular color in the image is corrected to a color that humans latently memorize and feel to be the most beautiful, that is, a memory color, are available. This type of image capturing apparatus corrects, for example, the skin color of a person in an image to a predetermined color (e.g., see Japanese Unexamined Patent Application Publication No. 2004-297698).

SUMMARY OF THE INVENTION

The face color varies from person to person. If the face colors of different persons in an image are corrected to the same predetermined color, the corrected image becomes unnatural.

It is thus desirable to correct the color of a face in an image to a face color suitable to that face.

According to an embodiment of the present invention, there is provided an image processing apparatus including the following elements: face-image storage means for storing a face image, which is an image of a predetermined face, as a registered face image; color storage means for storing face-color information, which is information regarding a face color of the registered face image; detecting means for detecting a face image in an input image; correcting means for correcting face-color information of the face image detected in the input image; and comparing means for comparing the face image detected in the input image with the registered face image and obtaining a registered face image that is most similar to the detected face image as a comparison result. The correcting means corrects face-color information of a face image detected in a next input image on the basis of the face-color information of the registered face image serving as the comparison result, which is stored in the color storage means.

The image processing apparatus may further include adjusting means for adjusting white balance of the input image, and the detecting means may detect a face image in the white-balance-adjusted input image.

The image processing apparatus may further include determining means for determining whether the determining means has confidence in the white-balance-adjusted input image on the basis of a statistic of color information, which is information regarding the color of the white-balance-unadjusted input image; and storage control means for storing, in the case where the determining means is determined to have confidence in the white-balance-adjusted input image, face-color information of the face image detected in the white-balance-adjusted input image as face-color information of a registered face image serving as a comparison result of the face image in the color storage means. The correcting means may correct, in the case where the determining means is determined not to have confidence in the white-balance-adjusted input image, the face-color information of the face image detected in the next input image subsequent to the white-balance-adjusted input image on the basis of the face-color information of the registered face image serving as the comparison result, which is stored in the color storage means.

The image processing apparatus may further include table storage means for storing a table in which the statistic of the white-balance-unadjusted color information is associated with the degree of confidence in the white-balance-adjusted color information. The determining means may read, on the basis of the statistic of the color information of the white-balance-unadjusted input image, the degree of confidence associated with the statistic from the table, and determine whether the determining means has confidence in the white-balance-adjusted input image on the basis of the degree of confidence.

In the image processing apparatus, the correcting means may correct the face-color information of the next input image by adjusting the white balance of the next input image on the basis of the face-color information of the registered face image serving as the comparison result, which is stored in the color storage means.

According to another embodiment of the present invention, there is provided an image processing method including the steps of detecting a face image, which is an image of a face, in an input image; comparing the face image detected in the input image with a registered face image, which is a predetermined face image stored in advance, and obtaining a registered face image that is most similar to the detected face image as a comparison result; and correcting face-color information of a face image detected in a next input image on the basis of pre-stored face-color information regarding the registered face image serving as the comparison result.

According to yet another embodiment of the present invention, there is provided a program for allowing a computer to execute a process including the steps of detecting a face image, which is an image of a face, in an input image; comparing the face image detected in the input image with a registered face image, which is a predetermined face image stored in advance, and obtaining a registered face image that is most similar to the detected face image as a comparison result; and correcting face-color information of a face image detected in a next input image on the basis of pre-stored face-color information regarding the registered face image serving as the comparison result.

According to the foregoing embodiments of the present invention, a face image, which is an image of a face, is detected in an input image. The face image detected in the input image is compared with a registered face image, which is a predetermined face image stored in advance. A registered face image that is most similar to the detected face image is obtained as a comparison result. On the basis of pre-stored face-color information of the registered face image serving as the comparison result, face-color information of a face image detected in the next input image is corrected.

According to a further embodiment of the present invention, there is provided an image processing apparatus including the following elements: face-image storage means for storing a face image, which is an image of a predetermined face, as a registered face image; color storage means for storing face-color information, which is information regarding a face color of the registered face image; comparing means for detecting a face image in an input image, comparing the face image with the registered face image, and obtaining a registered face image that is most similar to the face image as a comparison result; and correcting means for correcting face-color information of the face image detected in the input image on the basis of face-color information of the registered face image serving as the comparison result, which is stored in the color storage means.

The image processing apparatus may further include adjusting means for adjusting white balance of the input image. The comparing means may detect a face image in the white-balance unadjusted or adjusted input image. The correcting means may correct face-color information of a face image detected in the white-balance-adjusted input image on the basis of the face-color information of the registered face image serving as the comparison result.

The image processing apparatus may further include determining means for determining whether the determining means has confidence in the white-balance-adjusted input image on the basis of a statistic of color information, which is information regarding the color of the white-balance-unadjusted input image; and storage control means for storing, in the case where the determining means is determined to have confidence in the white-balance-adjusted input image, face-color information of the face image detected in the white-balance-adjusted input image as face-color information of a registered face image serving as a comparison result of the face image in the color storage means. The correcting means may correct, in the case where the determining means is determined not to have confidence in the white-balance-adjusted input image, the face-color information of the face image detected in the white-balance-adjusted input image on the basis of the face-color information of the registered face image serving as the comparison result, which is stored in the color storage means.

The image processing apparatus may further include table storage means for storing a table in which the statistic of the white-balance-unadjusted color information is associated with the degree of confidence in the white-balance-adjusted color information. The determining means may read, on the basis of the statistic of the color information of the white-balance-unadjusted input image, the degree of confidence associated with the statistic from the table, and determine whether the determining means has confidence in the white-balance-adjusted input image on the basis of the degree of confidence.

In the image processing apparatus, the correcting means may correct the face-color information of the input image by adjusting the white balance of the input image on the basis of the face-color information of the registered face image serving as the comparison result, which is stored in the color storage means.

According to another embodiment of the present invention, there is provided an image processing method including the steps of detecting a face image, which is an image of a face, in an input image, comparing the face image with a registered face image, which is a predetermined face image stored in advance, and obtaining a registered face image that is most similar to the face image as a comparison result; and correcting face-color information of the face image detected in the input image on the basis of pre-stored face-color information of the registered face image serving as the comparison result.

According to yet another embodiment of the present invention, there is provided a program for allowing a computer to execute a process including the steps of detecting a face image, which is an image of a face, in an input image, comparing the face image with a registered face image, which is a predetermined face image stored in advance, and obtaining a registered face image that is most similar to the face image as a comparison result; and correcting face-color information of the face image detected in the input image on the basis of pre-stored face-color information of the registered face image serving as the comparison result.

According to the foregoing embodiments of the present invention, a face image, which is an image of a face, is detected in an input image. The face image is compared with a registered face image, which is a predetermined face image stored in advance. A registered face image that is most similar to the face image is obtained as a comparison result. On the basis of pre-stored face-color information of the registered face image serving as the comparison result, face-color information of the face image detected in the input image is corrected.

Accordingly, an image can be corrected. Further, the color of a face in an image can be corrected to a face color suitable to that face.

BRIEF DESCRIPTION OF THE DRAWINGS

FIG. 3 illustrates face color correction performed by a color reproducing unit;

FIG. 4 illustrates face color correction performed by the color reproducing unit;

FIG. 5 illustrates an exemplary face-color table;

DESCRIPTION OF THE PREFERRED EMBODIMENTS

Figure 1:
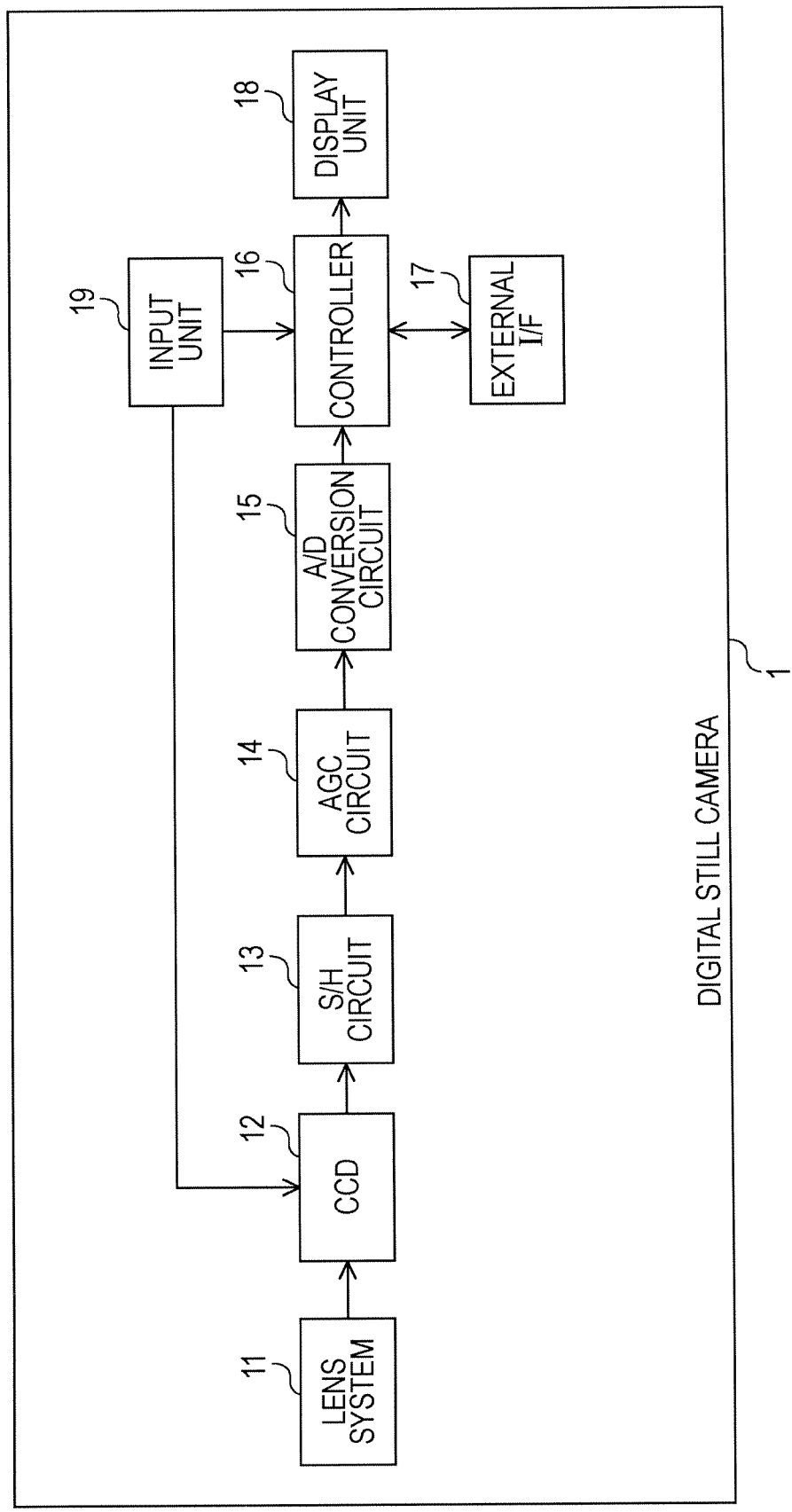
FIG. 1 is a block diagram of an exemplary structure of a digital still camera according to an embodiment of the present invention.

Before describing embodiments of the present invention, the correspondence between the features of the claims and the specific elements disclosed in embodiments of the present invention described with reference to the specification or the drawings is discussed below. This description is intended to assure that embodiments supporting the claimed invention are described in this specification or the drawings. Thus, even if an element in the following embodiments is not described as relating to a certain feature of the present invention in the specification or the drawings, that does not necessarily mean that the element does not relate to that feature of the claims. Conversely, even if an element is described herein as relating to a certain feature of the claims, that does not necessarily mean that the element does not relate to other features of the claims.

An image processing apparatus (e.g., a digital still camera 1 shown in FIG. 1) according to an embodiment of the present invention includes the following elements: face-image storage means (e.g., a face-image storage unit 61 shown in FIG. 2) for storing a face image, which is an image of a predetermined face, as a registered face image; color storage means (e.g., a face-color storage unit 62 shown in FIG. 2) for storing face-color information, which is information regarding a face color of the registered face image; detecting means (e.g., a detector 43 shown in FIG. 2) for detecting a face image in an input image; correcting means (e.g., a color reproducing unit 44 shown in FIG. 2) for correcting face-color information of the face image detected in the input image; and comparing means (e.g., a comparator 51 shown in FIG. 2) for comparing the face image detected in the input image with the registered face image and obtaining a registered face image that is most similar to the detected face image as a comparison result. The correcting means corrects face-color information of a face image detected in a next input image on the basis of the face-color information of the registered face image serving as the comparison result, which is stored in the color storage means.

Figure 2:
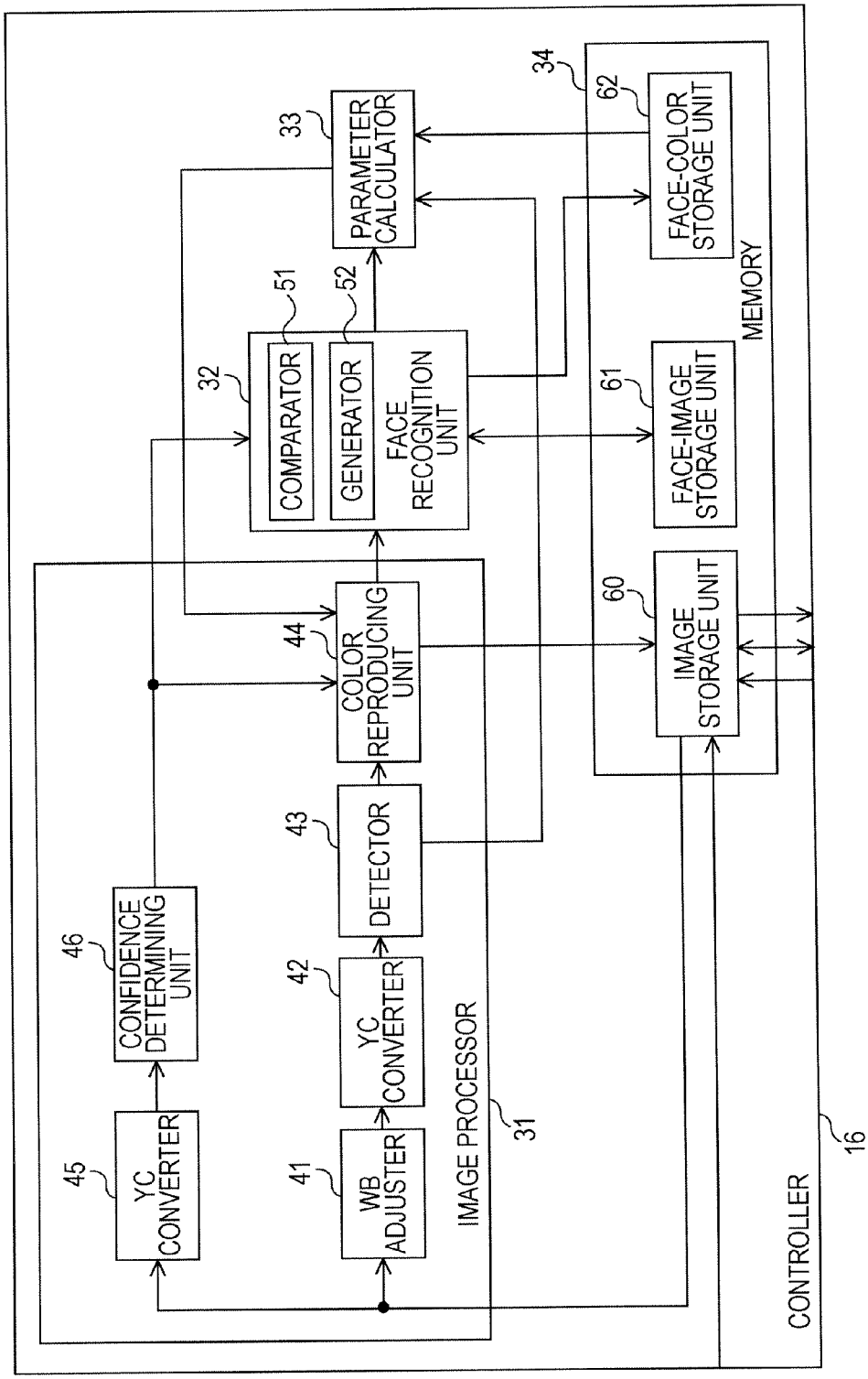
FIG. 2 is a block diagram of an exemplary detailed structure of a controller.

The image processing apparatus further includes adjusting means (e.g., a white-balance (WB) adjuster 41 shown in FIG. 2) for adjusting white balance of the input image, and the detecting means detects a face image in the white-balance-adjusted input image.

The image processing apparatus further includes determining means (e.g., a confidence determining unit 46 shown in FIG. 2) for determining whether the determining means has confidence in the white-balance-adjusted input image on the basis of a statistic of color information, which is information regarding the color of the white-balance-unadjusted input image; and storage control means (e.g., a generator 52 shown in FIG. 2) for storing, in the case where the determining means is determined to have confidence in the white-balance-adjusted input image, face-color information of the face image detected in the white-balance-adjusted input image as face-color information of a registered face image serving as a comparison result of the face image in the color storage means. The correcting means corrects, in the case where the determining means is determined not to have confidence in the white-balance-adjusted input image, the face-color information of the face image detected in the next input image subsequent to the white-balance-adjusted input image on the basis of the face-color information of the registered face image serving as the comparison result, which is stored in the color storage means.

Figure 9:
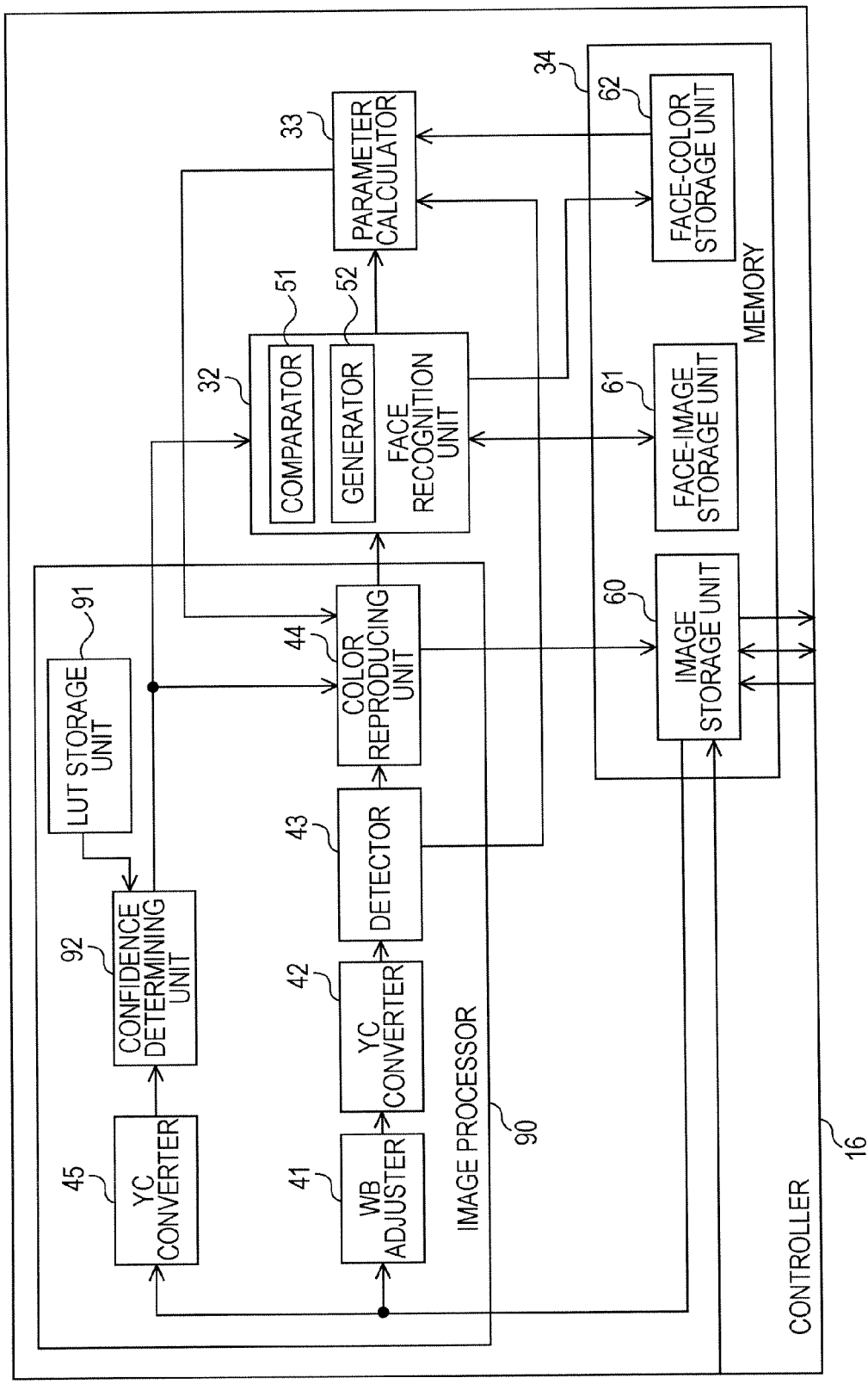
FIG. 9 is a block diagram of another exemplary detailed structure of the controller.

The image processing apparatus further includes table storage means (e.g., a look-up table (LUT) storage unit 91 shown in FIG. 9) for storing a table in which the statistic of the white-balance-unadjusted color information is associated with the degree of confidence in the white-balance-adjusted color information. The determining means reads, on the basis of the statistic of the color information of the white-balance-unadjusted input image, the degree of confidence associated with the statistic from the table, and determines whether the determining means has confidence in the white-balance-adjusted input image on the basis of the degree of confidence.

Figure 6:
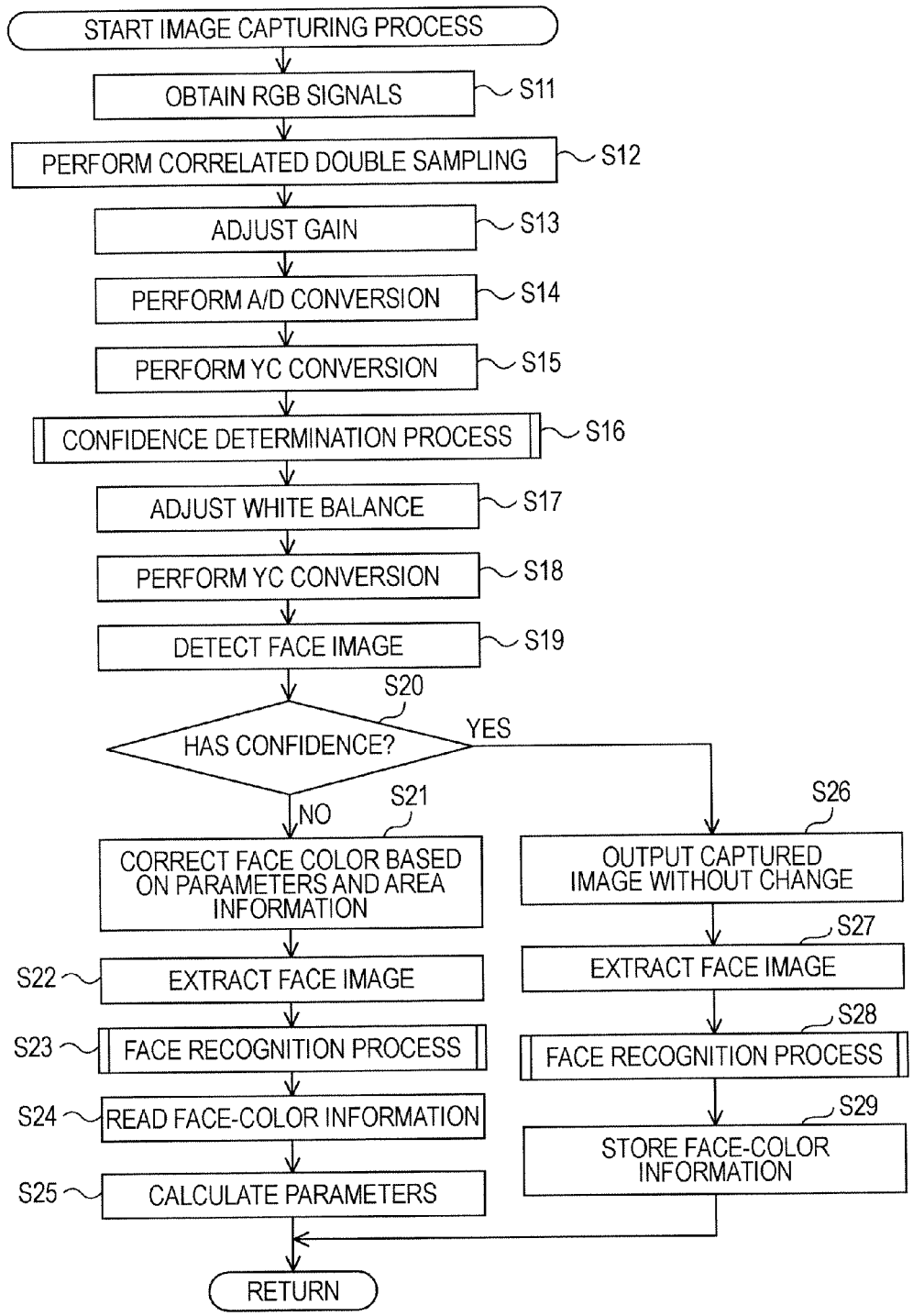
FIG. 6 is a flowchart of an image capturing process.

An image processing method or a program according to another embodiment of the present invention includes the steps of detecting a face image, which is an image of a face, in an input image (e.g., step S19 of FIG. 6); comparing the face image detected in the input image with a registered face image, which is a predetermined face image stored in advance, and obtaining a registered face image that is most similar to the detected face image as a comparison result (e.g., step S43 of FIG. 8); and correcting face-color information of a face image detected in a next input image on the basis of pre-stored face-color information regarding the registered face image serving as the comparison result (e.g., step S21 of FIG. 6).

An image processing apparatus (e.g., the digital still camera 1 shown in FIG. 1) according to another embodiment of the present invention includes the following elements: face-image storage means (e.g., the face-image storage unit 61 shown in FIG. 12) for storing a face image, which is an image of a predetermined face, as a registered face image; color storage means (e.g., the face-color storage unit 62 shown in FIG. 12) for storing face-color information, which is information regarding a face color of the registered face image; comparing means (e.g., a comparator 121 shown in FIG. 12) for detecting a face image in an input image, comparing the face image with the registered face image, and obtaining a registered face image that is most similar to the face image as a comparison result; and correcting means (e.g., a color reproducing unit 112 shown in FIG. 12) for correcting face-color information of the face image detected in the input image on the basis of face-color information of the registered face image serving as the comparison result, which is stored in the color storage means.

The image processing apparatus further includes adjusting means (e.g., the WB adjuster 41 shown in FIG. 2) for adjusting white balance of the input image. The comparing means detects a face image in the white-balance unadjusted or adjusted input image. The correcting means corrects face-color information of a face image detected in the white-balance-adjusted input image on the basis of the face-color information of the registered face image serving as the comparison result.

The image processing apparatus further includes determining means (e.g., the confidence determining unit 46 shown in FIG. 2) for determining whether the determining means has confidence in the white-balance-adjusted input image on the basis of a statistic of color information, which is information regarding the color of the white-balance-unadjusted input image; and storage control means (a generator 122 shown in FIG. 12) for storing, in the case where the determining means is determined to have confidence in the white-balance-adjusted input image, face-color information of the face image detected in the white-balance-adjusted input image as face-color information of a registered face image serving as a comparison result of the face image in the color storage means. The correcting means corrects, in the case where the determining means is determined not to have confidence in the white-balance-adjusted input image, the face-color information of the face image detected in the white-balance-adjusted input image on the basis of the face-color information of the registered face image serving as the comparison result, which is stored in the color storage means.

The image processing apparatus further includes table storage means (e.g., as in FIG. 9, the LUT storage unit 91 added to the controller 16 shown in FIG. 12) for storing a table in which the statistic of the white-balance-unadjusted color information is associated with the degree of confidence in the white-balance-adjusted color information. The determining means reads, on the basis of the statistic of the color information of the white-balance-unadjusted input image, the degree of confidence associated with the statistic from the table, and determines whether the determining means has confidence in the white-balance-adjusted input image on the basis of the degree of confidence.

Figure 13:
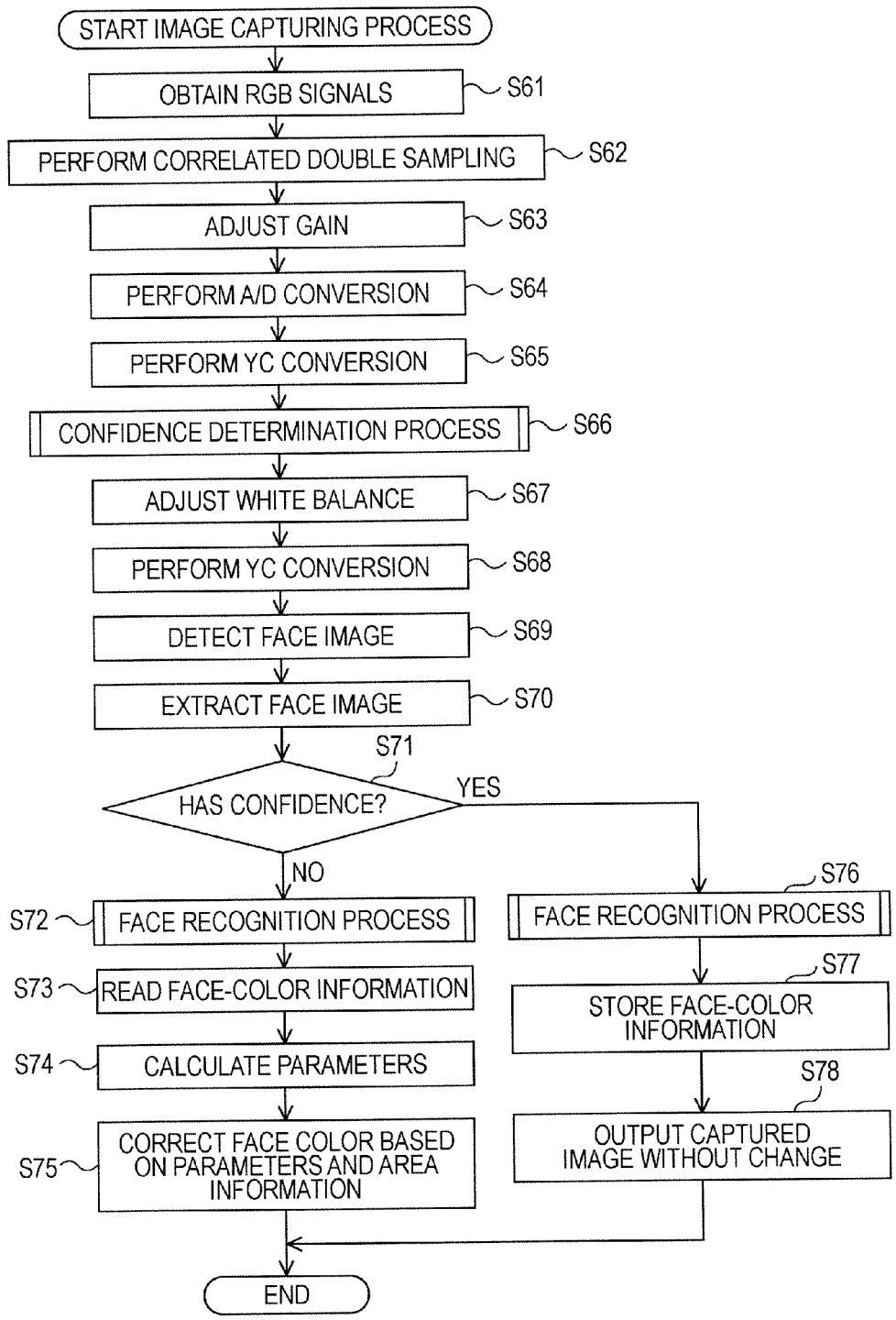
FIG. 13 is a flowchart of another image capturing process.

An image processing method or a program according to another embodiment of the present invention includes the steps of detecting a face image, which is an image of a face, in an input image, comparing the face image with a registered face image, which is a predetermined face image stored in advance, and obtaining a registered face image that is most similar to the face image as a comparison result (e.g., step S66 of FIG. 13); and correcting face-color information of the face image detected in the input image on the basis of pre-stored face-color information of the registered face image serving as the comparison result (e.g., step S73 of FIG. 13).

Specific embodiments of the present invention will be described in detail below with reference to the drawings.

FIG. 1 is a block diagram of an exemplary structure of a digital still camera 1 according to an embodiment of the present invention.

The digital still camera 1 shown in FIG. 1 includes a lens system 11, a charge coupled device (CCD) 12, a sample/hold (S/H) circuit 13, an automatic gain control (AGC) circuit 14, an analog-to-digital (A/D) conversion circuit 15, a controller 16, an external interface (I/F) 17, a display unit 18, and an input unit 19. The digital still camera 1 captures an image of an object and corrects the color of a face in the captured image.

The lens system 11 includes a shutter, a diaphragm, a condenser, and the like. The lens system 11 illuminates the CCD 12 with light incident thereon to form an image of an object on a light-receiving side of the CCD 12. In accordance with an image-capturing start command supplied from the input unit 19, the CCD 12 performs photoelectric conversion of the image (light) of the object, which is formed on the light-receiving side of the CCD 12, to generate analog image signals represented in the red, green, and blue (RGB) color system (hereinafter referred to as "RGB signals") and supplies the RGB signals to the S/H circuit 13. In this example, the CCD 12 is used as an image pickup device. Instead of using the CCD 12, a complementary metal oxide semiconductor (CMOS) sensor, for example, can be used as an image pickup device.

The S/H circuit 13 applies, for example, correlated double sampling on the analog RGB signals supplied from the CCD 12 and supplies the sampled signals to the AGC circuit 14.

The AGC circuit 14 adjusts the gain of the analog RGB signals supplied from the S/H circuit 13 and supplies the adjusted signals to the A/D conversion circuit 15.

The A/D conversion circuit 15 performs A/D conversion of the analog RGB signals supplied from the AGC circuit 14 and supplies digital RGB signals obtained as the result of the A/D conversion as an RGB image to the controller 16.

The controller 16 performs image processing, such as white balance adjustment, conversion to the YCbCr color system, and color correction, on the RGB image supplied from the A/D conversion circuit 15. In accordance with an image capturing command supplied from the input unit 19, the controller 16 supplies a captured image, which is an image represented in the YCbCr color system obtained as the result of image processing, via the external I/F 17 to an external apparatus (not shown) so that the captured image is recorded in the external apparatus. Further, the controller 16 supplies the captured image, which is obtained as the result of image processing, to the display unit 18 so that the captured image is displayed on the display unit 18. The details of the controller 16 will be described with reference to FIG. 2.

The external I/F 17 exchanges signals with an external apparatus (not shown). For example, the external I/F 17 records a captured image supplied from the controller 16 in the external apparatus. In accordance with a request issued from the external apparatus, the external I/F 17 obtains a captured image from the controller 16 and stores the captured image in the external apparatus.

The display unit 18 displays a captured image supplied from the controller 16. The input unit 19 accepts a command entered from a user. For example, the input unit 19 accepts a command entered from the user to set an operation mode to an image capturing mode for capturing an image of an object and, in accordance with the command, supplies an image-capturing start command to the CCD 12. The input unit 19 accepts a command entered from the user to capture an image and, in accordance with the command, supplies an image capturing command to the controller 16.

FIG. 2 is a block diagram of an exemplary detailed structure of the controller 16 shown in FIG. 1.

The controller 16 shown in FIG. 2 includes an image processor 31, a face recognition unit 32, a parameter calculator 33, and a memory 34. The controller 16 calculates parameters relating to correction of the color of a face in a captured image and, on the basis of the parameters, corrects the color of a face in the next captured image.

The image processor 31 includes a white-balance (WB) adjuster 41, YC converters 42 and 45, a detector 43, a color reproducing unit 44, and a confidence determining unit 46. The image processor 31 performs image processing on an RGB image, which is supplied from the A/D conversion circuit 15 shown in FIG. 1 and stored in an image storage unit 60 of the memory 34.

The WB adjuster 41 reads the RGB image stored in the image storage unit 60 and multiplies pixel values of the RGB image by associated predetermined coefficients to adjust the white balance of the RGB image such that the color balance of an achromatic color portion of the object can be actually represented in the achromatic color. The WB adjuster 41 supplies the adjusted RGB image to the YC converter 42.

The YC converter 42 performs YC conversion of the RGB image supplied from the WB adjuster 41 to convert the color system from the RGB color system to the YCbCr color system. Specifically, the YC converter 42 applies YC matrix processing on the RGB image and band limitation on chroma components, thereby generating an image represented in the YCbCr color system. The YC converter 42 supplies the image represented in the YCbCr color system as a captured image to the detector 43.

The detector 43 detects a face image, which is an image of a face, in the captured image supplied from the YC converter 42. The detector 43 supplies information for specifying an area of the detected face image (hereinafter referred to as "area information") and the captured image to the parameter calculator 33 and the color reproducing unit 44.

On the basis of the parameters supplied from the parameter calculator 33, the area information supplied from the detector 43, and the determination result supplied from the confidence determining unit 46, the color reproducing unit 44 corrects the face color of the face image included in the captured image supplied from the detector 43. The color reproducing unit 44 supplies the captured image in which the face color has been corrected to the image storage unit 60 so that the captured image is stored therein. On the basis of the area information, the color reproducing unit 44 extracts a face image from the captured image in which the face color has been corrected and supplies the extracted face image to the face recognition unit 32.

Depending on the determination result, the color reproducing unit 44 does not change the captured image supplied from the detector 43 and supplies the captured image as it is to the image storage unit 60 so that the captured image is stored therein. On the basis of the determination result and the area information, the color reproducing unit 44 extracts a face image from the captured image supplied from the detector 43 and supplies the face image to the face recognition unit 32.

The YC converter 45 reads the RGB image stored in the image storage unit 60 and performs YC conversion of the RGB image, as has been done by the YC converter 42. The YC converter 45 supplies an image represented in the YCbCr color system, which is obtained as the result of the YC conversion, to the confidence determining unit 46.

On the basis of the averages of the image represented in the YCbCr color system supplied from the YC converter 45, the confidence determining unit 46 determines whether it has confidence in the captured image output from the YC converter 42. In the following description, it is assumed that the WB adjuster 41 performs optimal white balance adjustment of an image captured outdoors in sunlight. The confidence determining unit 46 determines whether it has confidence in a captured image depending on whether or not the captured image is an image captured outdoors in sunlight. The confidence determining unit 46 supplies the determination result to the face recognition unit 32 and the color reproducing unit 44.

The face recognition unit 32 performs a face recognition process of recognizing a face in the face image included in the captured image. The face recognition process is described in, for example, Japanese Unexamined Patent Application Publication No. 2004-302644.

The face recognition unit 32 includes a comparator 51 and a generator 52.

The comparator 51 compares a face image supplied from the color reproducing unit 44 with a face image registered in a face-image storage unit 61 of the memory 34 (hereinafter referred to as a "registered face image"). The comparator 51 registers a face image that is similar to none of registered face images as a new registered face image in the face-image storage unit 61. Specifically, the comparator 51 adds to the new registered face image a name of a person specific to the registered face image and stores the name of the person in association with the new registered face image in the face-image storage unit 61.

In accordance with the determination result supplied from the confidence determining unit 46, the comparator 51 supplies the name of a person corresponding to a registered face image that is most similar to the face image as a comparison result to the parameter calculator 33. In accordance with the determination result supplied from the confidence determining unit 46, the comparator 51 supplies the comparison result and the face image to the generator 52.

On the basis of the face image supplied from the comparator 51, the generator 52 generates face-color information, which is information regarding the face color, and stores a face-color table in which the face-color information is associated with the name of the person serving as the comparison result in a face-color storage unit 62 of the memory 34.

On the basis of the comparison result supplied from the comparator 51 of the face recognition unit 32, the parameter calculator 33 reads face-color information associated with the name of the person serving as the comparison result from the face-color table stored in the face-color storage unit 62. On the basis of the area information supplied from the detector 43, the parameter calculator 33 extracts a face image from the captured image supplied from the detector 43.

On the basis of the extracted face image and the read face-color information, the parameter calculator 33 calculates parameters for correcting the face color of the face image to the face color defined by the face-color information and supplies the parameters to the color reproducing unit 44. Using the parameters, the color reproducing unit 44 corrects the face color of a face image included in the next captured image. Accordingly, the color reproducing unit 44 can reproduce the face color defined by the face-color information of the registered face image that is most similar to the face image included in the captured image, which is stored in the face-color storage unit 62, in the face image included in the next captured image.

The memory 34 includes the image storage unit 60, the face-image storage unit 61, and the face-color storage unit 62.

The image storage unit 60 stores an RGB image supplied from the A/D conversion circuit 15 shown in FIG. 1. The image storage unit 60 stores a captured image supplied from the color reproducing unit 44. An image capturing command is supplied from the input unit 19 to the image storage unit 60. In accordance with the image capturing command, the image storage unit 60 reads a captured image stored therein and supplies the captured image to the external I/F 17 so that the captured image is stored in an external apparatus.

A captured-image obtaining request is supplied from the external I/F 17 to the image storage unit 60. In accordance with the request, the image storage unit 60 supplies a captured image to the external I/F 17. Further, the image storage unit 60 supplies a captured image stored therein to the display unit 18 so that the captured image is displayed on the display unit 18.

The face-image storage unit 61 stores the name of a person and a registered face image, which are supplied from the comparator 51, in association with each other. The face-color storage unit 62 stores a face-color table supplied from the generator 52 in which the name of a person is associated with face-color information.

Referring now to FIGS. 3 and 4, face-color correction performed by the color reproducing unit 44 will be described.

FIG. 3 illustrates a captured image 71, which has been captured outdoors in sunlight.

The captured image 71 shown in FIG. 3 includes a face image 72 of a certain person. In the case where the captured image 71 is captured, since the captured image 71 is an image captured outdoors in sunlight, the confidence determining unit 46 determines that it has confidence in the captured image 71 output from the YC converter 42. In this case, the color reproducing unit 44 does not perform face-color correction of the captured image 71 and supplies the captured image 71 as it is to the image storage unit 60 so that the captured image 71 is stored therein. As a result, the captured image 71 without any correction is displayed on the display unit 18.

On the basis of the face image 72 extracted from the captured image 71, the generator 52 generates face-color information and stores a face-color table in which the face-color information is associated with the name of the person serving as the comparison result obtained by the comparator 51 in the face-color storage unit 62.

FIG. 4 illustrates a captured image 81, which has been captured inside a fluorescent-lit room into which sunlight is admitted through.

The captured image 81 shown in FIG. 4 includes a face image 82 of the same person as that of the face image 72 shown in FIG. 3. In the case where the captured image 81 is captured, since the captured image 81 is not an image captured outdoors in sunlight, the confidence determining unit 46 determines that it has no confidence in the captured image 81 output from the YC converter 42. In this case, the color reproducing unit 44 performs face-color correction of the face image 82 using, for example, parameters calculated on the basis of the face-color information of the face image 72 shown in FIG. 3, which is stored in the face-color storage unit 62 in association with the name of the person corresponding to the face image 82.

Accordingly, the face color of the face image 72 of a certain person, which is included in the captured image 71 captured outdoors in sunlight where the optimal white balance adjustment is performed, can be reproduced in the face image 82 of the same person, which has been captured under two light sources, namely, sunlight and fluorescent light, where the optimal white balance adjustment is difficult to perform.

FIG. 5 illustrates an exemplary face-color table stored in the face-color storage unit 62 shown in FIG. 2.

In the face-color table illustrated in FIG. 5, the name of each person is associated with values of a Y signal, a Cb signal, and a Cr signal in the YCbCr color system, which serve as face-color information of the person with that name.

In the example illustrated in FIG. 5, the name "Mr. A" is associated with the Y signal value "145", the Cb signal value "−9", and the Cr signal value "13" serving as face-color information of Mr. A. That is, the Y signal of a face image of Mr. A that has been captured outdoors in sunlight has a value of 145; the Cb signal has a value of −9; and the Cr signal has a value of 13.

The name "Mr. B" is not associated with any face-color information yet. That is, no image of Mr. B has been captured outdoors in sunlight yet.

Further, the name "Mr. C" is associated with the Y signal value "160", the Cb signal value "−4", and the Cr signal value "10" serving as face-color information of Mr. C. That is, the Y signal of a face image of Mr. C that has been captured outdoors in sunlight has a value of 160; the Cb signal has a value of −4; and the Cr signal has a value of 10.

The face-color information in the face-color table may include, instead of values of signals in the YCbCr color system, values of signals in other color systems (e.g., the RGB color system), statistics obtained during the conversion to a predetermined color system, or histograms of signals in a predetermined color system.

Referring now to FIG. 6, an image capturing process of capturing, with the digital still camera 1 shown in FIG. 1, an image of the face of a person as an object will be described. In the case where a user command for setting the operation mode to the image capturing mode has been accepted, the image capturing process is performed at every predetermined time until an image capturing command or a command for changing the operation mode is given.

In step S11, the CCD 12 shown in FIG. 1 obtains, in response to an image-capturing start command supplied from the input unit 19, analog RGB signals by performing photoelectric conversion of an image of the object, which is formed on the light-receiving side of the CCD 12, and supplies the RGB signals to the S/H circuit 13. After the processing in step S11, the process proceeds to step S12, and the S/H circuit 13 applies correlated double sampling on the analog RGB signals supplied from the CCD 12 and supplies the sampled signals to the AGC circuit 14.

After the processing in step S12, the process proceeds to step S13, and the AGC circuit 14 adjusts the gain of the analog RGB signals supplied from the S/H circuit 13 and supplies the adjusted signals to the A/D conversion circuit 15. After the processing in step S13, the process proceeds to step S14, and the A/D conversion circuit 15 performs A/D conversion of the analog RGB signals supplied from the AGC circuit 14 and supplies digital RGB signals obtained as the result of the A/D conversion as an RGB image to the image storage unit 60 (FIG. 2) of the controller 16 so that the RGB image is stored in the image storage unit 60.

After the processing in step S14, the process proceeds to step S15, and the YC converter 45 shown in FIG. 2 reads the RGB image stored in the image storage unit 60 and performs YC conversion of the RGB image. The YC converter 45 supplies an image represented in the YCbCr color system, which is obtained as the result of the YC conversion, to the confidence determining unit 46.

After the processing in step S15, the process proceeds to step S16, and the confidence determining unit 46 performs a confidence determination process of determining whether it has confidence in a captured image output from the YC converter 42. The confidence determination process will be described in detail later with reference to FIG. 7.

After the processing in step S16, the process proceeds to step S17, and the WB adjuster 41 reads the RGB image stored in the image storage unit 60, adjusts the white balance of the RGB image, and supplies the adjusted RGB image to the YC converter 42.

After the processing in step S17, the process proceeds to step S18, and the YC converter 42 performs YC conversion of the RGB image supplied from the WB adjuster 41 and supplies an image represented in the YCbCr color system, which is obtained as the result of the YC conversion, as a captured image to the detector 43.

After the processing in step S18, the process proceeds to step S19, and the detector 43 detects a face image, which is an image of a face, in the captured image supplied from the YC converter 42. The detector 43 supplies area information of the detected face image and the captured image to the parameter calculator 33 and the color reproducing unit 44.

After the processing in step S19, the process proceeds to step S20, and the color reproducing unit 44 determines whether it has confidence in the captured image output from the YC converter 42 on the basis of the determination result of performing the confidence determination process, which is supplied from the confidence determining unit 46.

In the case where it is determined in step S20 that the color reproducing unit 44 has no confidence in the captured image output from the YC converter 42, the process proceeds to step S21, and the color reproducing unit 44 corrects the face color of the face image included in the captured image supplied from the detector 43 on the basis of parameters supplied from the parameter calculator 33 and the area information supplied from the detector 43. The color reproducing unit 44 supplies the captured image in which the face color has been corrected to the image storage unit 60 so that the captured image is stored therein.

After the processing in step S21, the process proceeds to step S22, and the color reproducing unit 44 extracts the face image from the captured image in which the face color has been corrected on the basis of the area information supplied from the detector 43 and supplies the extracted face image to the face recognition unit 32.

After the processing in step S22, the process proceeds to step S23, and the face recognition unit 32 performs a face recognition process. The face recognition process will be described in detail later with reference to FIG. 8.

After the processing in step S23, the process proceeds to step S24, and the parameter calculator 33 reads, on the basis of a comparison result which is obtained as a result of performing the face recognition process and is supplied from the face recognition unit 32, face-color information recorded in association with the name of a person serving as the comparison result from the face-color table stored in the face-color storage unit 62.

If no face-color information associated with the name of a person serving as the comparison result has been stored yet, for example, in the case where the face-color table shown in FIG. 5 is stored in the face-color storage unit 62 and the comparison result indicates "Mr. B", the parameter calculator 33 reads values of the Y signal, Cb signal, and Cr signal set as initial values as face-color information.

After the processing in step S24, the process proceeds to step S25, and the parameter calculator 33 extracts the face image from the captured image supplied from the detector 43 on the basis of the area information supplied from the detector 43 and, on the basis of the face image and the face-color information, calculates parameters for correcting the face color of that face image to the face color defined by the face-color information.

Specifically, the parameter calculator 33 calculates a parameter α of the Y signal in accordance with equation 1:

$$Y'=\alpha Y \quad (1)$$

where Y denotes the average of Y signals of the face image; Y' denotes the Y signal value of the face-color information; and the parameter α takes a value within a predetermined range.

In the case where the parameter α in equation 1 is a value outside the predetermined range, the parameter calculator 33 sets the parameter α to the closest value within the predetermined range.

Further, the parameter calculator 33 calculates a parameter β of the Cb signal and a parameter θ of the Cr signal using equation 2 with a rotation matrix:

$$\begin{pmatrix} C_b' \\ C_r' \end{pmatrix} = \beta \begin{pmatrix} \cos\theta & -\sin\theta \\ \sin\theta & \cos\theta \end{pmatrix} \begin{pmatrix} C_b \\ C_r \end{pmatrix} \quad (2)$$

where Cb denotes the average of Cb signals of the face image; Cr denotes the average of Cr signals of the face image; Cb' denotes the Cb signal value of the face-color information; and Cr' denotes the Cr signal value of the face-color information.

The parameter calculator 33 supplies the parameters α, β, and θ calculated in the foregoing manners to the color reproducing unit 44, and the image capturing process ends.

Thereafter in step S22, the color reproducing unit 44 uses the parameter α supplied from the parameter calculator 33 to calculate equation 1 wherein Y is the average of Y signals of the face color of the face image included in the captured image supplied from the detector 43. The color reproducing unit 44 uses Y' obtained as a result of the calculation as the Y signal value of the corrected face color and corrects the Y signal of the face color of the captured image.

Using the parameters β and θ supplied from the parameter calculator 33, the color reproducing unit 44 calculates equation 2 wherein Cb and Cr are the averages of Cb signals and Cr signals of the face color of the face image included in the captured image supplied from the detector 43. The color reproducing unit 44 uses Cb' and Cr' obtained as a result of the calculation as the Cb signal value and the Cr signal value of the corrected face color and corrects the Cb signal and the Cr signal of the face color of the captured image.

In the above description, the Y signal of the face color has been corrected using the parameter α in accordance with equation 1. Alternatively, the Y signal of the face color may be corrected by performing gamma (γ) correction. For example, a method of correcting the face color described in Japanese Unexamined Patent Application Publication No. 2004-297698 may be used to correct the face color.

In contrast, in the case where it is determined in step S20 that the color reproducing unit 44 has confidence in the captured image output from the YC converter 42, the process proceeds to step S26, and the color reproducing unit 44 does not change the captured image supplied from the detector 43 and outputs the captured image as it is to the image storage unit 60 so that the captured image is stored therein. The process proceeds to step S27.

In step S27, the color reproducing unit 44 extracts the face image from the captured image supplied from the detector 43 on the basis of the determination result and the area information and supplies the face image to the face recognition unit 32, and the process proceeds to step S28. In step S28, the face recognition unit 32 performs a face recognition process, as in step S23.

After the processing in step S28, the process proceeds to step S29, and the generator 52 generates face-color information on the basis of the face image supplied from the comparator 51 and stores a face-color table in which the face-color information is associated with the name of a person serving as the comparison result in the face-color storage unit 62. The process ends.

In the above-described manner, the controller 16 shown in FIG. 2 corrects the color of a face in the next captured image on the basis of the face-color information stored in association with the name of a person which is obtained as a result of performing the face recognition process on the captured image. Therefore, the controller 16 can correct the face color of a person included in an image captured in any circumstance to the color suitable to the face of that person.

Since the controller 16 shown in FIG. 2 stores face-color information of a captured image in the case where it is determined that the controller 16 has confidence in the captured image, that is, the optimal white balance adjustment has been performed, and calculates parameters on the basis of the face-color information, the user should not necessarily enter parameters. Therefore, it becomes less bothersome for the user.

After the image capturing process shown in FIG. 6, for example, in the case where the user operates the input unit 19 to enter an image capturing command, the captured image corrected in the immediately preceding step S21 is displayed as the image capturing result on the display unit 18 or recorded in an external apparatus via the external I/F 17.

Figure 7:
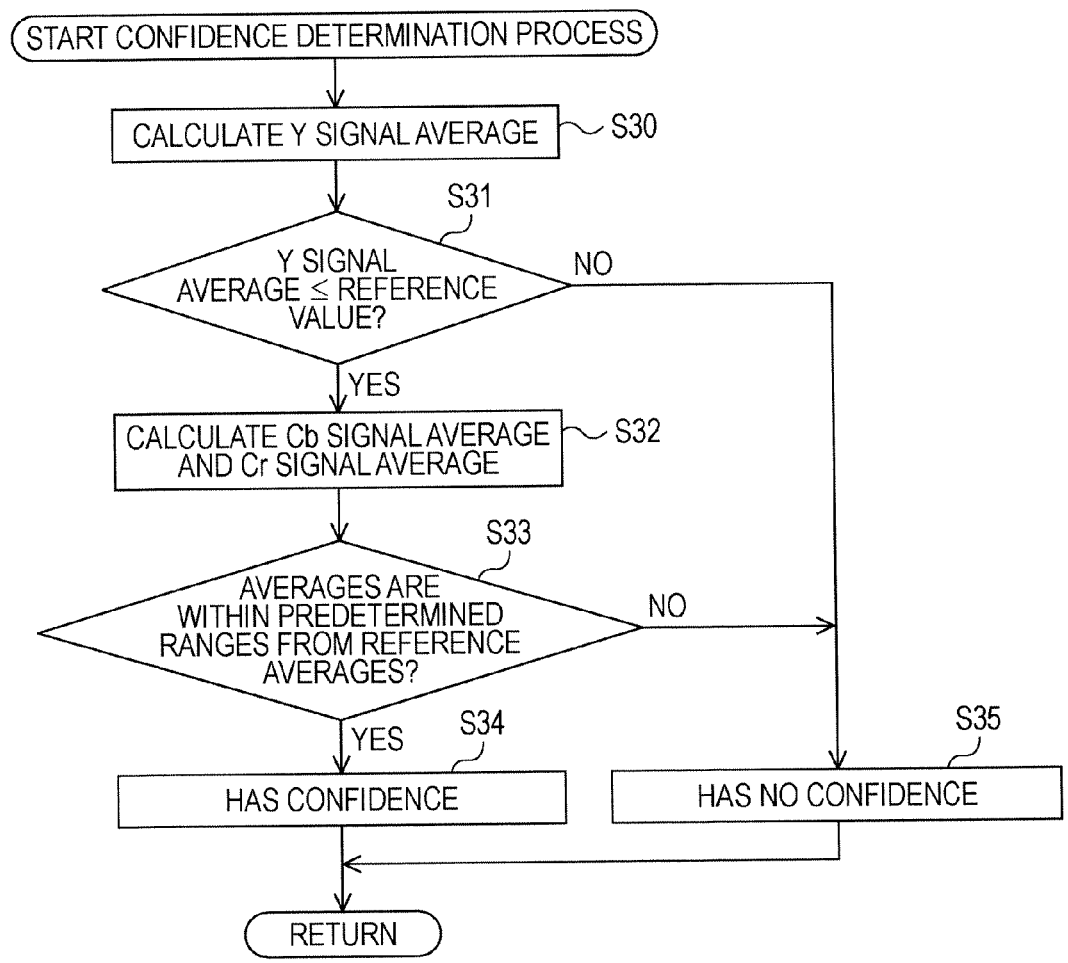
FIG. 7 is a flowchart of a confidence determination process.

Referring now to FIG. 7, the confidence determination process performed in step S16 of FIG. 6 will be described.

In step S30, the confidence determining unit 46 calculates the average of Y signals of the image represented in the YCbCr color system, which is supplied from the YC converter 45, and the process proceeds to step S31. In step S31, the confidence determining unit 46 determines whether the average Y signal is greater than or equal to a preset reference value. That is, the confidence determining unit 46 determines whether the image represented in the YCbCr color system, which is supplied from the YC converter 45, is an image captured outdoors.

In the case where it is determined in step S31 that the average Y signal is greater than or equal to the reference value, the process proceeds to step S32, and the confidence determining unit 46 calculates, of the image represented in the YCbCr color system, the average of Cb signals and the average of Cr signals corresponding to Y signals greater than or equal to the predetermined value. The process proceeds to step S33.

In step S33, the confidence determining unit 46 determines whether the average Cb signal and the average Cr signal calculated in step S32 are within predetermined ranges from the averages of Cb signals and Cr signals of a general image captured outdoors in sunlight (hereinafter referred to as "reference averages"). That is, the confidence determining unit 46 determines whether the image represented in the YCbCr color system, which is supplied from the YC converter 45, is an image captured outdoors in sunlight.

In the case where it is determined in step S33 that the averages calculated in step S32 are within predetermined ranges from the reference averages, the process proceeds to step S34, and the confidence determining unit 46 determines that it has confidence in the captured image output from the YC converter 42. The confidence determining unit 46 supplies the determination result to the face recognition unit 32 and the color reproducing unit 44, and the process returns to step S16 of FIG. 6.

In contrast, in the case where it is determined in step S31 that the average Y signal is below the reference value, or in the case where it is determined in step S33 that the averages calculated in step S32 are not within predetermined ranges from the reference averages, the process proceeds to step S35, and the confidence determining unit 46 determines that it has no confidence in the captured image output from the YC converter 42. The confidence determining unit 46 supplies the determination result to the face recognition unit 32 and the color reproducing unit 44, and the process returns to step S16 of FIG. 6.

Figure 8:
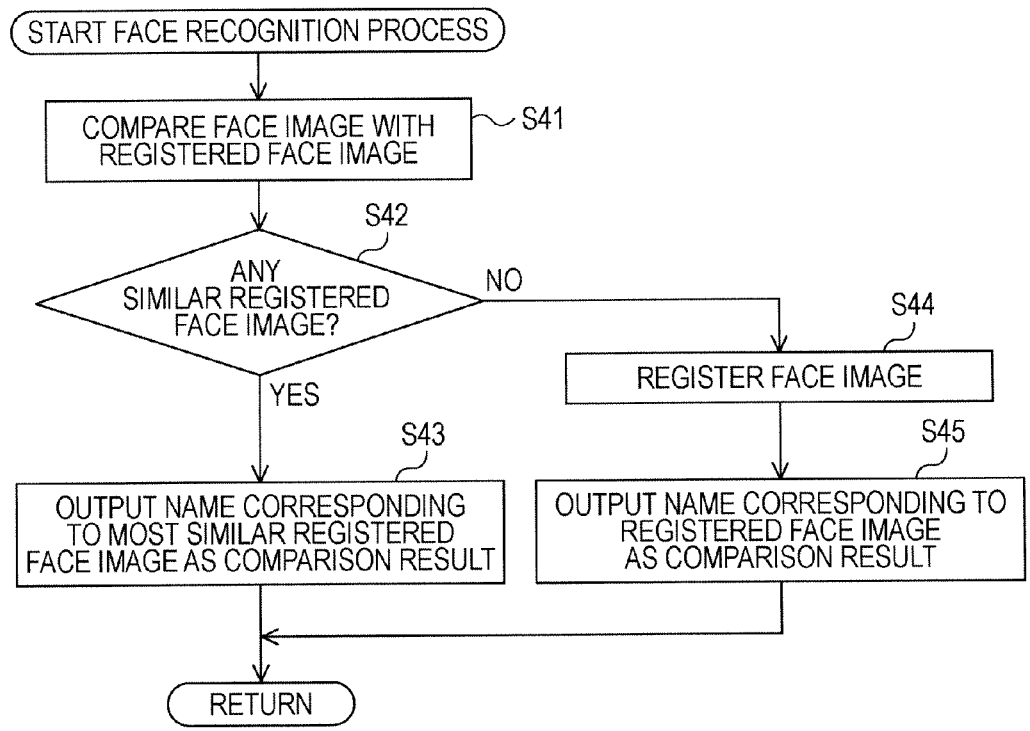
FIG. 8 is a flowchart of a face recognition process.

Referring now to FIG. 8, the face recognition process performed in steps S23 and S28 of FIG. 6 will be described.

In step S41, the comparator 51 compares the face image supplied from the color reproducing unit 44 with a registered face image stored in the face-image storage unit 61, and the process proceeds to step S42.

In step S42, the comparator 51 determines whether there is any registered face image similar to the face image supplied from the color reproducing unit 44. In the case where it is determined that there is a similar registered face image, the process proceeds to step S43.

In step S43, the comparator 51 outputs the name of a person corresponding to the registered face image that is most similar to the face image supplied from the color reproducing unit 44 as a comparison result to the parameter calculator 33, and the process returns to step S23 of FIG. 6. Alternatively, the comparator 51 outputs the comparison result and the face image to the generator 52, and the process returns to step S28 of FIG. 6.

In contrast, in the case where it is determined in step S42 that there is no registered face image similar to the face image supplied from the color reproducing unit 44, the process proceeds to step S44, and the comparator 51 registers the face image supplied from the color reproducing unit 44 as a new registered face image in the face-image storage unit 61.

After the processing in step S44, the process proceeds to S45, and the comparator 51 outputs the name of a person corresponding to the face image registered in step S44 as a comparison result to the parameter calculator 33, and the process returns to step S23 of FIG. 6. Alternatively, the comparator 51 outputs the comparison result and the face image to the generator 52, and the process returns to step S28 of FIG. 6.

FIG. 9 is a block diagram of another exemplary detailed structure of the controller 16 shown in FIG. 1.

The controller 16 shown in FIG. 9 includes the face recognition unit 32, the parameter calculator 33, the memory 34, and an image processor 90.

The image processor 90 includes the WB adjuster 41, the YC converters 42 and 45, the detector 43, the color reproducing unit 44, a look-up table (LUT) storage unit 91, and a confidence determining unit 92. Using look-up tables (LUTs) stored in the LUT storage unit 91, the controller 16 performs a confidence determination process. The same elements as those shown in FIG. 2 are denoted by the same reference numerals, and repeated descriptions thereof are omitted to avoid redundancy.

The LUT storage unit 91 stores a Y-signal LUT in which the average of Y signals of an image represented in the YCbCr color system is associated with the degree of confidence in a captured image obtained from an RGB image corresponding to the Y signals. Further, the LUT storage unit 91 stores a C-signal LUT in which the average of Cb signals and the average of Cr signals of the image represented in the YCbCr color system are associated with the degree of confidence in a captured image obtained from an RGB image corresponding to the Cb signals and the Cr signals.

On the basis of the averages of the image represented in the YCbCr system supplied from the YC converter 45, the confidence determining unit 92 reads the degree of confidence in the Y signal and the degree of confidence in the Cr signal and the Cb signal from the LUT storage unit 91. The confidence determining unit 92 adds the two read degrees of confidence and, in accordance with the sum, determines whether it has confidence in the captured image output from the YC converter 42. The confidence determining unit 92 supplies the determination result to the face recognition unit 32 and the color reproducing unit 44.

Figure 10:
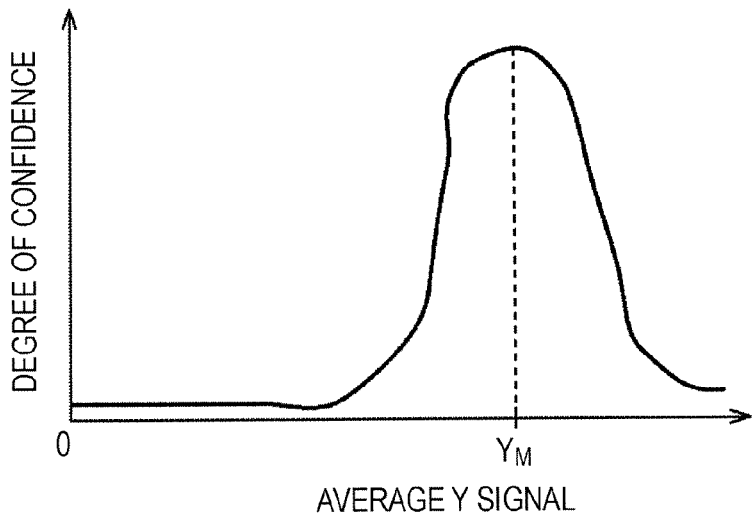
FIG. 10 is a graph showing a relationship between an average Y signal and the degree of confidence in a Y-signal look-up table (LUT)

FIG. 10 is a graph showing a relationship between the average Y signal and the degree of confidence in the Y-signal LUT stored in the LUT storage unit 91 shown in FIG. 9.

In the example shown in FIG. 10, in the range where the Y signal average ranges from zero to a predetermined value $Y_M$, the degree of confidence becomes higher as the average Y signal becomes larger. In the case where the Y signal average is the predetermined value $Y_M$, the degree of confidence is the highest. In the case where the Y signal average exceeds the predetermined value $Y_M$, the degree of confidence becomes lower as the Y signal average becomes larger.

The relationship between the Y signal average and the degree of confidence varies depending on the characteristic of the WB adjuster 41, and is not limited to that shown in FIG. 10.

Figure 11:
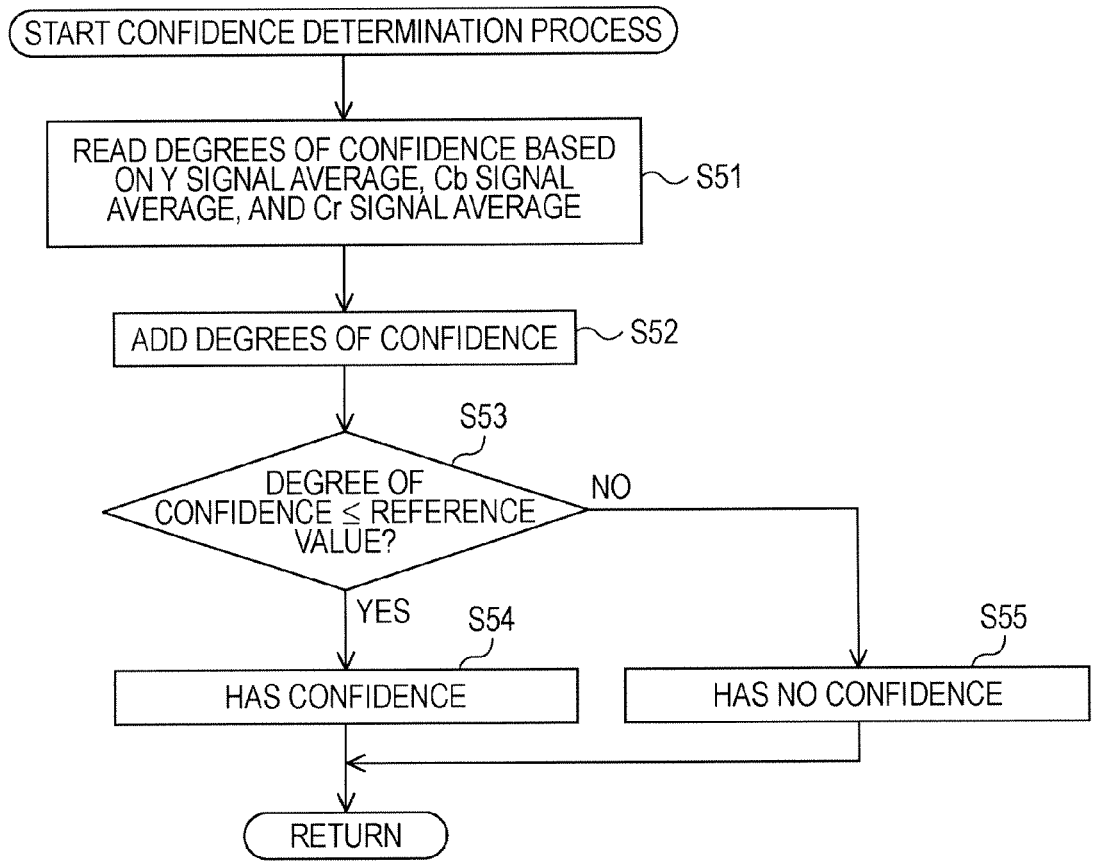
FIG. 11 is a flowchart of another confidence determination process.

Referring now to FIG. 11, a confidence determination process performed by the confidence determining unit 92 shown in FIG. 9 will be described.

In step S51, the confidence determining unit 92 reads the degrees of confidence from the LUT storage unit 91 on the basis of the Y signal average, the Cb signal average, and the Cr signal average of the image represented in the YCbCr color system, which is supplied from the YC converter 45.

Specifically, the confidence determining unit 92 reads the degree of confidence associated with the average of Y signals of the image represented in the YCbCr color system, which is supplied from the YC converter 45, from the Y-signal LUT stored in the LUT storage unit 91. Also, the confidence determining unit 92 reads the degree of confidence associated with the average of Cb signals and the average of Cr signals of the image represented in the YCbCr color system, which is supplied from the YC converter 45, from the C-signal LUT stored in the LUT storage unit 91.

After the processing in step S51, the process proceeds to S52, and the confidence determining unit 92 adds the degree of confidence in the Y signals and the degree of confidence in the Cb signals and the Cr signals, and obtains the sum as the final degree of confidence. The process proceeds to step S53.

In step S53, the confidence determining unit 92 determines whether the final degree of confidence is greater than or equal to a reference value. In the case where it is determined that the final degree of confidence is greater than or equal to the reference value, the process proceeds to step S54.

In step S54, the confidence determining unit 92 determines that it has confidence in the captured image output from the YC converter 42, and supplies the determination result to the face recognition unit 32 and the color reproducing unit 44. The process returns to step S16 of FIG. 6.

In contrast, in the case where it is determined in step S53 that the final degree of confidence is below the reference value, the process proceeds to step S55, and the confidence determining unit 92 determines that it has no confidence in the captured image output from the YC converter 42 and supplies the determination result to the face recognition unit 32 and the color reproducing unit 44. The process returns to step S16 of FIG. 6.

Figure 12:
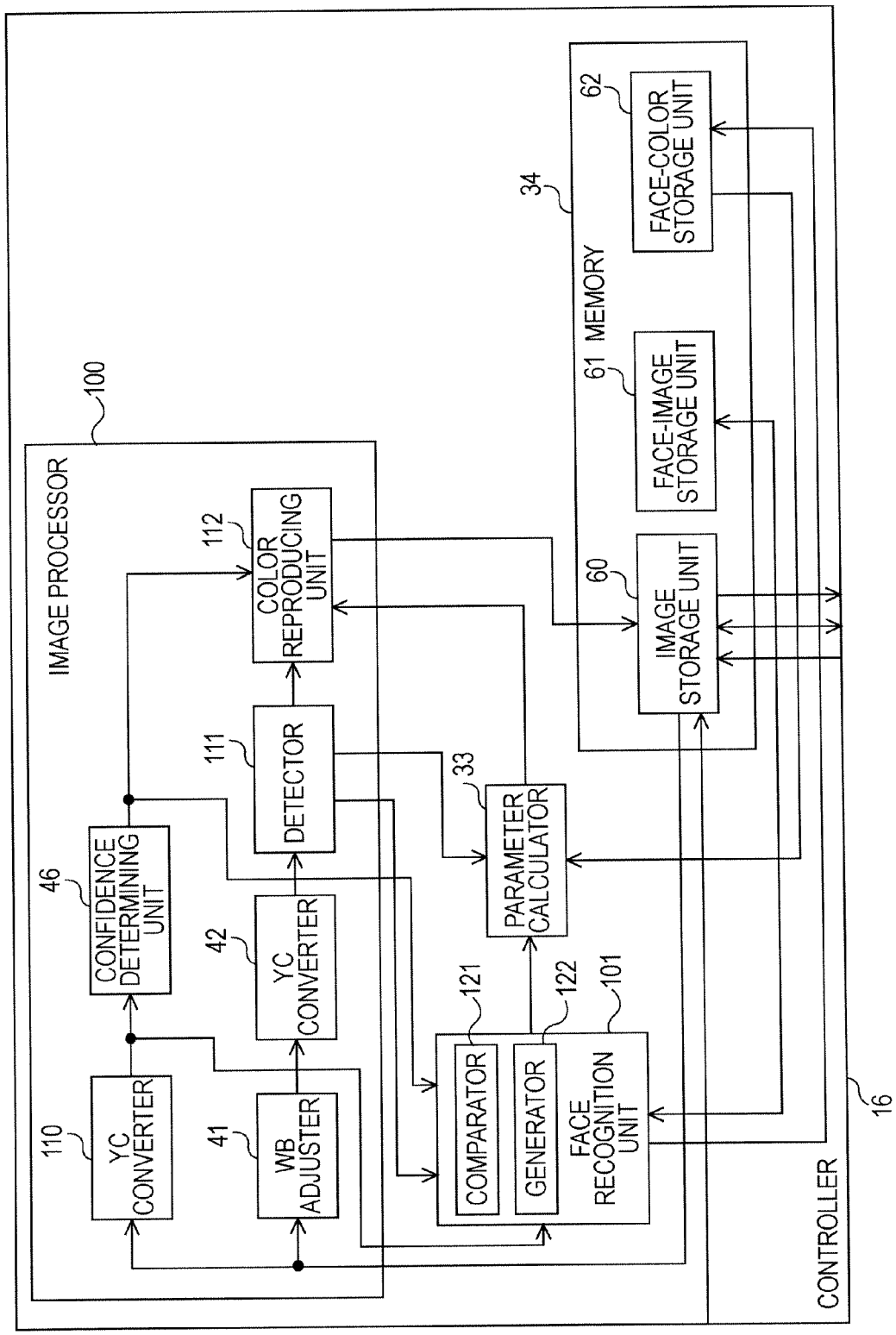
FIG. 12 is a block diagram of yet another exemplary detailed structure of the controller.

FIG. 12 is a block diagram of yet another exemplary detailed structure of the controller 16 shown in FIG. 1.

The controller 16 shown in FIG. 12 includes the parameter calculator 33, the memory 34, an image processor 100, and a face recognition unit 101. The controller 16 corrects the color of a face in a captured image using parameters calculated in accordance with the result of performing a face recognition process on the captured image.

The image processor 100 includes the WB adjuster 41, the YC converter 42, the confidence determining unit 46, a YC converter 110, a detector 111, and a color reproducing unit 112. The same elements as those shown in FIG. 2 are denoted by the same reference numerals, and repeated descriptions thereof are omitted to avoid redundancy.

As in the YC converter 45 shown in FIG. 2, the YC converter 110 reads an RGB image stored in the image storage unit 60 and performs YC conversion of the RGB image. The YC converter 110 supplies an image represented in the YCbCr image, which is obtained as the result of the YC conversion, to the confidence determining unit 46 and the face recognition unit 101.

As in the detector 43 shown in FIG. 2, the detector 111 detects a face image in a captured image supplied from the YC converter 42. The detector 111 supplies area information of the detected face image and the captured image to the parameter calculator 33, the face recognition unit 101, and the color reproducing unit 112.

As in the color reproducing unit 44 shown in FIG. 2, the color reproducing unit 112 corrects the face color of the face image included in the captured image supplied from the detector 43 on the basis of parameters supplied from the parameter calculator 33, the area information supplied from the detector 111, and a determination result supplied from the confidence determining unit 46. As in the color reproducing unit 44 shown in FIG. 2, the color reproducing unit 112 supplies the captured image in which the face color has been corrected to the image storage unit 60 so that the captured image is stored therein.

As in the color reproducing unit 44 shown in FIG. 2, depending on the determination result, the color reproducing unit 112 does not change the captured image supplied from the detector 43 and supplies the captured image as it is to the image storage unit 60 so that the captured image is stored therein.

The face recognition unit 101 includes a comparator 121 and a generator 122.

The comparator 121 extracts a face image from the image represented in the YCbCr color system, which is supplied from the YC converter 110, and compares the face image with a registered face image stored in the face-image storage unit 61. As in the comparator 51 shown in FIG. 2, the comparator 121 registers a face image that is similar to none of registered face images as a registered face image in the face-image storage unit 61.

As in the comparator 51 shown in FIG. 1, the comparator 121 supplies, in accordance with a determination result supplied from the confidence determining unit 46, the name of a person corresponding to the registered face image that is most similar to the face image as a comparison result to the parameter calculator 33. Further, as in the comparator 51 shown in FIG. 2, the comparator 121 supplies the comparison result to the generator 122 in accordance with a determination result supplied from the confidence determining unit 46.

On the basis of the area information supplied from the detector 111, the generator 122 extracts a face image from the captured image supplied from the detector 111. On the basis of the face image, the generator 122 generates face-color information and stores a face-color table in which the face-color information is associated with the name of the person serving as the comparison result supplied from the comparator 121 in the face-color storage unit 62.

In FIG. 12, the face recognition unit 101 performs the face recognition process using the white-balance-unadjusted image represented in the YCbCr color system. Alternatively, however, the face recognition unit 101 may perform the face recognition process using the captured image which is a white-balance-adjusted image represented in the YCbCr color system.

Referring now to FIG. 13, in the case where the controller 16 shown in FIG. 1 has the structure shown in FIG. 12, an image capturing process of capturing, with the digital still camera 1, an image of the face of a person as an object will be described. In the case where, for example, a user command for setting the operation mode to the image capturing mode has been accepted, the image capturing process is performed at every predetermined time until an image capturing command or a command for changing the operation mode is given.

Since the processing performed in steps S61 to S69 is similar to that performed in steps S1 to S19 of FIG. 6, descriptions thereof are omitted to avoid redundancy.

After the processing in step S69, the process proceeds to step S70, and the comparator 121 extracts a face image from an image represented in the YCbCr color system, which is supplied from the YC converter 110. The process proceeds to step S71.

Since the processing in steps S71 to S74 is similar to that performed in steps S20 and S23 to S25 of FIG. 6, descriptions thereof are omitted to avoid redundancy.

After the processing in step S74, the process proceeds to step S75, and the color reproducing unit 112 corrects the face color of the face image included in the captured image supplied from the detector 111 on the basis of parameters calculated in step S74 and area information supplied from the detector 111. The color reproducing unit 112 supplies the captured image in which the face color has been corrected to the image storage unit 60 so that the captured image is stored therein.

In contrast, in the case where it is determined in step S71 that the color reproducing unit 44 has confidence in the captured image output from the YC converter 42, the process proceeds to step S76, and the face recognition unit 101 performs a face recognition process, as in step S28 of FIG. 6.

After the processing in step S76, the process proceeds to step S77, and the generator 122 extracts a face image from the captured image supplied from the detector 111 on the basis of the area information supplied from the detector 111, generates face-color information on the basis of the face image, and stores a face-color table in which the face-color information is associated with the name of a person serving as a comparison result in the face-color storage unit 62.

After the processing in step S77, the process proceeds to step S78, and the color reproducing unit 112 does not change the captured image supplied from the detector 111 and outputs the captured image as it is to the image storage unit 60 so that the captured image is stored therein. The process ends.

Although not shown in the drawing, the controller 16 shown in FIG. 12 may include the LUT storage unit 91 shown in FIG. 9, and the confidence determining unit 46 shown in FIG. 12 may perform a confidence determination process using the Y-signal LUT and the C-signal LUT.

Although the averages of the image represented in the YCbCr color system are used to perform the confidence determination process in the above description, instead of the averages, other statistics including histograms or distributions may be used to perform the confidence determination process.

In the above description, in the case where a captured image is an image captured outdoors in sunlight, it is determined that the controller 16 has confidence in the captured image. However, an image in which the controller 16 is determined to have confidence is not limited thereto. For example, in the case where a captured image is an image that is distinguishable by the statistics of the Y signals, Cb signals, and Cr signals and has been captured with lighting where the WB adjuster 41 can perform optimal white balance adjustment, the controller 16 may be determined to have confidence in that captured image.

Further, the name of a person is associated with a registered face image and its face-color information in the above description. However, information associated with a registered face image and its face-color information is not limited to the name of a person; any information for specifying a registered face image may be associated with the registered face image and its face-color information.

In the above description, parameters regarding the face-color correction are calculated on the basis of a face image and face-color information. However, parameters regarding the white-balance adjustment may be calculated on the basis of a face image and face-color information. In this case, the parameters are supplied not to the color reproducing unit 44 or 112, but to the WB adjuster 41, and the WB adjuster 41 adjusts the white balance using the parameters, thereby correcting the face color of the captured image. In this case, the controller 16 may not necessarily include the color reproducing unit 44 or 112.

The series of processes described above may be executed by hardware or software. In the case where the series of processes is executed by software, a program constituting the software is installed from a program recording medium onto a computer included in dedicated hardware or, for example, a general personal computer capable of executing various functions using various programs installed thereon.

Figure 14:
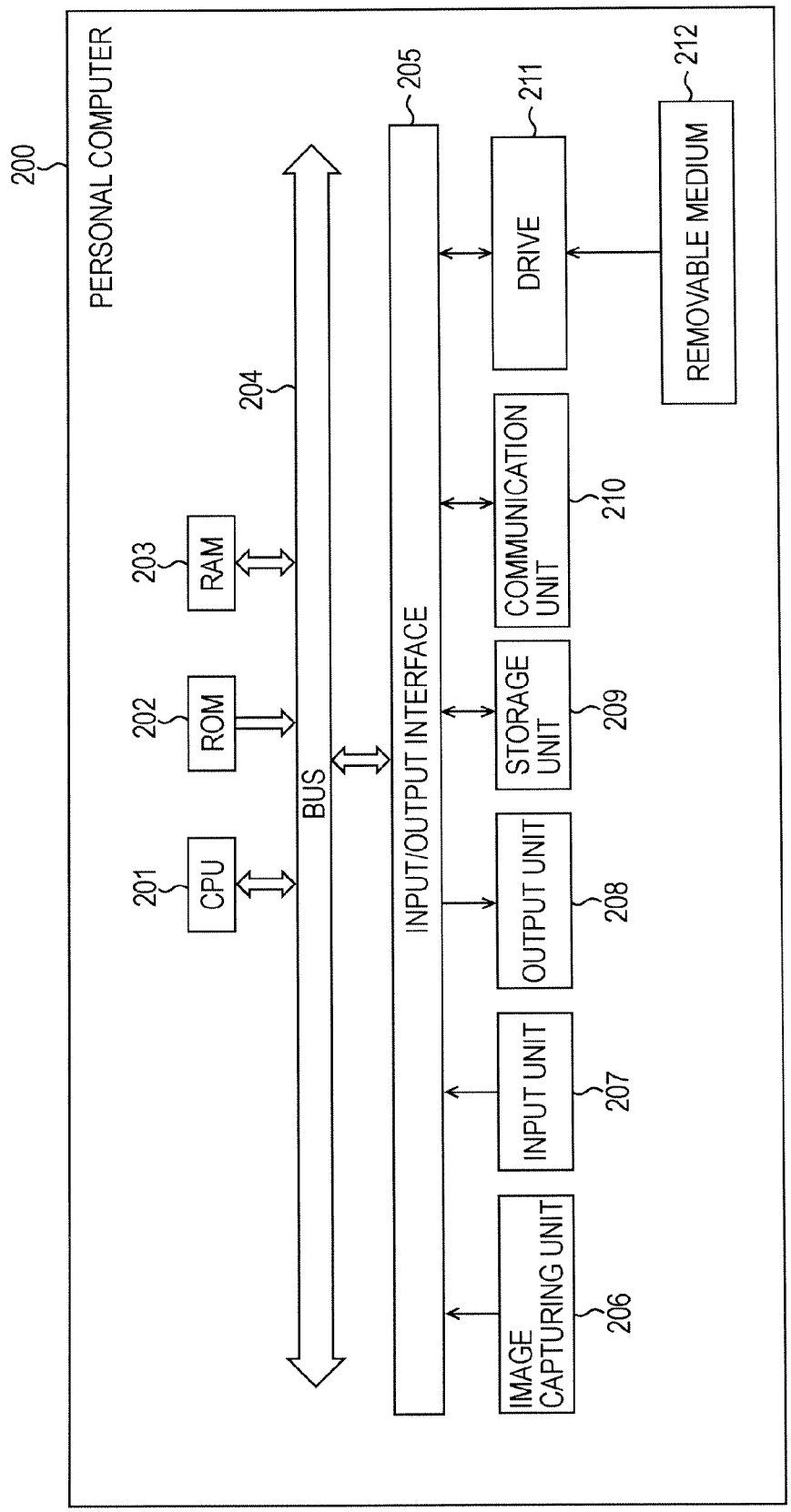
FIG. 14 is a block diagram of an exemplary structure of a computer.

FIG. 14 is a block diagram of an exemplary structure of a personal computer executing the above-described series of processes using a program. A central processing unit (CPU) 201 performs various processes in accordance with a program stored in a read-only memory (ROM) 202 or a storage unit 209. A random-access memory (RAM) 203 stores a program executed by the CPU 201 and data as necessary. The CPU 201, the ROM 202, and the RAM 203 are interconnected via a bus 204.

An input/output interface 205 is connected to the CPU 201 via the bus 204. The input/output interface 205 is connected to an image capturing unit 206 configured to capture an image of an object, an input unit 207 including a keyboard, a mouse, a microphone, and a reception unit configured to receive a command sent from a remote controller (not shown), and an output unit 208 including a display and a loudspeaker. The CPU 201 performs various processes in response to commands entered from the input unit 207. The CPU 201 outputs the processing results to the output unit 208.

The storage unit 209 connected to the input/output interface 205 includes, for example, a hard disk, and stores a program executed by the CPU 201 and various pieces of data. A communication unit 210 communicates with an external apparatus via a network, such as the Internet or a local area network (LAN).

A program may be obtained via the communication unit 210 and stored in the storage unit 209.

A drive 211 connected to the input/output interface 205 drives a removable medium 212 including a magnetic disk, an optical disk, a magneto-optical disk, or a semiconductor memory when the removable medium 212 is mounted therein, and obtains a program and data stored on the removable medium 212. If necessary, the program and data obtained are transferred to the storage unit 209 and stored in the storage unit 209.

In this specification, steps defining the program recorded on the program recording medium may include processes that are executed sequentially in the orders described, and also include processes that are executed in parallel or individually, not necessarily sequentially.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:
    face-image storage means for storing a face image, which is an image of a predetermined face, as a registered face image;
    color storage means for storing face-color information, which is information regarding a face color of the registered face image;
    detecting means for detecting a face image in an input image;
    correcting means for correcting face-color information of the face image detected in the input image;
    comparing means for comparing the face image detected in the input image with the registered face image and obtaining the registered face image as a comparison result, wherein the correcting means corrects face-color information of a face image detected in a next input image on the basis of the face-color information of the registered face image serving as the comparison result, which is stored in the color storage means;
    adjusting means for adjusting white balance of the input image, wherein the detecting means detects a face image in the white-balance-adjusted input image;
    determining means for determining whether the determining means has confidence in the white-balance-adjusted input image on the basis of a statistic of color information, which is information regarding the color of the white-balance-unadjusted input image; and storage control means for storing, in the case where the determining means is determined to have confidence in the white-balance-adjusted input image, face-color information of the face image detected in the white-balance-adjusted input image as face-color information of a registered face image serving as a comparison result of the face image in the color storage means, wherein the correcting means corrects, in the case where the determining means is determined not to have confidence in the white-balance-adjusted input image, the face-color information of the face image detected in the next input image subsequent to the white-balance-adjusted input image on the basis of the face-color information of the registered face image serving as the comparison result, which is stored in the color storage means.

2. The image processing apparatus according to claim 1, further comprising table storage means for storing a table in which the statistic of the white-balance-unadjusted color information is associated with the degree of confidence in the white-balance-adjusted color information, wherein the determining means reads, on the basis of the statistic of the color information of the white-balance-unadjusted input image, the degree of confidence associated with the statistic from the table, and determines whether the determining means has confidence in the white-balance-adjusted input image on the basis of the degree of confidence.

3. The image processing apparatus according to claim 1, wherein the correcting means corrects the face-color information of the next input image by adjusting the white balance of the next input image on the basis of the face-color information of the registered face image serving as the comparison result, which is stored in the color storage means.

4. An image processing method performed by an image processing apparatus, the method comprising:
   detecting, by a detector of the image processing apparatus, a face image, which is an image of a face, in an input image;
   comparing, by a comparator of the image processing apparatus, the face image detected in the input image with a registered face image, which is a predetermined face image stored in advance, and obtaining the registered face image as a comparison result;
   correcting, by a correcting unit of the image processing apparatus, face-color information of a face image detected in a next input image on the basis of pre-stored face-color information regarding the registered face image serving as the comparison result;
   adjusting, by a white balance adjusting unit of the image processing apparatus, white balance of the input image, wherein the detecting includes detecting a face image in the white-balance unadjusted or adjusted input image;
   determining, by a confidence determining unit of the image processing apparatus, a confidence in the white-balance-adjusted input image on the basis of a statistic of color information, which is information regarding the color of the white-balance-unadjusted input image;
   storing, in a face-color storage unit of the image processing apparatus, in the case where the determining is determined to have confidence in the white-balance-adjusted input image, face-color information of the face image detected in the white-balance-adjusted input image as face-color information of a registered face image serving as a comparison result; and
   correcting, by the correcting unit, in the case where the determining determines not to have confidence in the white-balance-adjusted input image, the face-color information of the face image detected in the next input image subsequent to the white-balance-adjusted input image on the basis of the face-color information of the registered face image serving as the comparison result.

5. A non-transitory computer-readable medium including a program, which when executed by an image processing device, causes the image processing device to execute a process comprising:
   detecting a face image, which is an image of a face, in an input image;
   comparing the face image detected in the input image with a registered face image, which is a predetermined face image stored in advance, and obtaining a registered face image as a comparison result; and
   correcting face-color information of a face image detected in a next input image on the basis of pre-stored face-color information regarding the registered face image serving as the comparison result;
   adjusting white balance of the input image, wherein the detecting includes detecting a face image in the white-balance unadjusted or adjusted input image;
   determining a confidence in the white-balance-adjusted input image on the basis of a statistic of color information, which is information regarding the color of the white-balance-unadjusted input image;
   storing, in the case where the determining determines to have confidence in the white-balance-adjusted input image, face-color information of the face image detected in the white-balance-adjusted input image as face-color information of a registered face image serving as a comparison result; and
   correcting, in the case where the determining determines not to have confidence in the white-balance-adjusted input image, the face-color information of the face image detected in the next input image subsequent to the white-balance-adjusted input image on the basis of the face-color information of the registered face image serving as the comparison result.

6. An image processing apparatus comprising:
   face-image storage means for storing a face image, which is an image of a predetermined face, as a registered face image;
   color storage means for storing face-color information, which is information regarding a face color of the registered face image;
   comparing means for detecting a face image in an input image, comparing the face image with the registered face image, and obtaining the registered face image as a comparison result;
   correcting means for correcting face-color information of the face image detected in the input image on the basis of face-color information of the registered face image serving as the comparison result, which is stored in the color storage means;
   adjusting means for adjusting white balance of the input image, wherein
   the comparing means detects a face image in the white-balance unadjusted or adjusted input image, and
   the correcting means corrects face-color information of a face image detected in the white-balance-adjusted input image on the basis of the face-color information of the registered face image serving as the comparison result;
   determining means for determining whether the determining means has confidence in the white-balance-adjusted input image on the basis of a statistic of color information, which is information regarding the color of the white-balance-unadjusted input image; and storage control means for storing, in the case where the determining means is determined to have confidence in the white-balance-adjusted input image, face-color information of the face image detected in the white-balance-adjusted input image as face-color information of a registered face image serving as a comparison result of the face image in the color storage means, wherein the correcting means corrects, in the case where the determining means is determined not to have confidence in the white-balance-adjusted input image, the face-color information of the face image detected in the white-balance-adjusted input image on the basis of the face-color information of the registered face image serving as the comparison result, which is stored in the color storage means.

7. The image processing apparatus according to claim 6, further comprising table storage means for storing a table in which the statistic of the white-balance-unadjusted color information is associated with the degree of confidence in the white-balance-adjusted color information, wherein the determining means reads, on the basis of the statistic of the color information of the white-balance-unadjusted input image, the degree of confidence associated with the statistic from the table, and determines whether the determining means has confidence in the white-balance-adjusted input image on the basis of the degree of confidence.

8. The image processing apparatus according to claim 6, wherein the correcting means corrects the face-color information of the input image by adjusting the white balance of the input image on the basis of the face-color information of the registered face image serving as the comparison result, which is stored in the color storage means.

9. An image processing method performed by an image processing apparatus, the method comprising:

detecting, by a detector of the image processing apparatus, a face image, which is an image of a face, in an input image;

comparing, by a comparator of the image processing apparatus, the face image with a registered face image, which is a predetermined face image stored in advance, and obtaining a registered face image as a comparison result;

correcting, by a correcting unit of the image processing apparatus, face-color information of the face image detected in the input image on the basis of pre-stored face-color information of the registered face image serving as the comparison result;

adjusting, by a white balance adjusting unit of the image processing apparatus, white balance of the input image, wherein the detecting includes detecting a face image in the white-balance unadjusted or adjusted input image;

correcting, by the correcting unit, face-color information of a face image detected in the white-balance-adjusted input image on the basis of the face-color information of the registered face image serving as the comparison result;

determining, by a confidence determining unit of the image processing apparatus, a confidence in the white-balance-adjusted input image on the basis of a statistic of color information, which is information regarding the color of the white-balance-unadjusted input image;

storing, in a color storage unit of the image processing apparatus, in the case where the determining is determined to have confidence in the white-balance-adjusted input image, face-color information of the face image detected in the white-balance-adjusted input image as face-color information of a registered face image serving as a comparison result; and correcting, by the correcting unit, in the case where the determining determines not to have confidence in the white-balance-adjusted input image, the face-color information of the face image detected in the white-balance-adjusted input image on the basis of the face-color information of the registered face image serving as the comparison result.

10. A non-transitory computer-readable medium including a program, which when executed by an image processing apparatus, causes the image processing apparatus to execute a process comprising:

detecting a face image, which is an image of a face, in an input image;

comparing the face image with a registered face image, which is a predetermined face image stored in advance, and obtaining the registered face image as a comparison result; and correcting face-color information of the face image detected in the input image on the basis of pre-stored face-color information of the registered face image serving as the comparison result;

adjusting white balance of the input image, wherein the detecting includes detecting a face image in the white-balance unadjusted or adjusted input image;

correcting face-color information of a face image detected in the white-balance-adjusted input image on the basis of the face-color information of the registered face image serving as the comparison result;

determining a confidence in the white-balance-adjusted input image on the basis of a statistic of color information, which is information regarding the color of the white-balance-unadjusted input image;

storing, in the case where the determining determines to have confidence in the white-balance-adjusted input image, face-color information of the face image detected in the white-balance-adjusted input image as face-color information of a registered face image serving as a comparison result; and correcting, in the case where the determining determines not to have confidence in the white-balance-adjusted input image, the face-color information of the face image detected in the white-balance-adjusted input image on the basis of the face-color information of the registered face image serving as the comparison result.

11. An image processing apparatus comprising:

a face-image storage unit configured to store a face image, which is an image of a predetermined face, as a registered face image;

a color storage unit configured to store face-color information, which is information regarding a face color of the registered face image;

a detector configured to detect a face image in an input image;

a correcting unit configured to correct face-color information of the face image detected in the input image;

a comparator configured to compare the face image detected in the input image with the registered face image and obtain the registered face image as a comparison result, wherein the correcting unit corrects face-color information of a face image detected in a next input image on the basis of the face-color information of the registered face image serving as the comparison result, which is stored in the color storage unit;

a white balance adjuster configured to adjust white balance of the input image, wherein the detector detects a face image in the white-balance-adjusted input image; and a confidence determining unit that determines a confidence in the white-balance-adjusted input image on the basis of a statistic of color information, which is information regarding the color of the white-balance-unadjusted input image, wherein the color storage unit stores, in the case where the determining unit determines to have confidence in the white-balance-adjusted input image, face-color information of the face image detected in the white-balance-adjusted input image as face-color information of a registered face image serving as a comparison result of the face image, and the correcting unit corrects, in the case where the determining determines not to have confidence in the white-balance-adjusted input image, the face-color information of the face image detected in the next input image subsequent to the white-balance-adjusted input image on the basis of the face-color information of the registered face image serving as the comparison result.

12. An image processing apparatus comprising:

a face-image storage unit configured to store a face image, which is an image of a predetermined face, as a registered face image;

a color storage unit configured to store face-color information, which is information regarding a face color of the registered face image;

a comparator configured to detect a face image in an input image, compare the face image with the registered face image, and obtain the registered face image as a comparison result;

a correcting unit configured to correct face-color information of the face image detected in the input image on the basis of face-color information of the registered face image serving as the comparison result, which is stored in the color storage unit;

a white balance adjuster configured to adjust white balance of the input image, wherein the comparator detects a face image in the white-balance unadjusted or adjusted input image, and the correcting unit corrects face-color information of a face image detected in the white-balance-adjusted input image on the basis of the face-color information of the registered face image serving as the comparison result; and a confidence determining unit that determines a confidence in the white-balance-adjusted input image on the basis of a statistic of color information, which is information regarding the color of the white-balance-unadjusted input image, wherein the color storage unit stores, in the case where the confidence determining unit determines to have confidence in the white-balance-adjusted input image, face-color information of the face image detected in the white-balance-adjusted input image as face-color information of a registered face image serving as a comparison result of the face image, and the correcting unit corrects, in the case where the confidence determining unit determines not to have confidence in the white-balance-adjusted input image, the face-color information of the face image detected in the white-balance-adjusted input image on the basis of the face-color information of the registered face image serving as the comparison result, which is stored in the color storage means.

* * * * *